May 19, 1931.  C. E. ENNIS ET AL  1,806,049
CHARGE HUMIDIFIER FOR EXPLOSIVE ENGINES
Filed Nov. 11, 1929
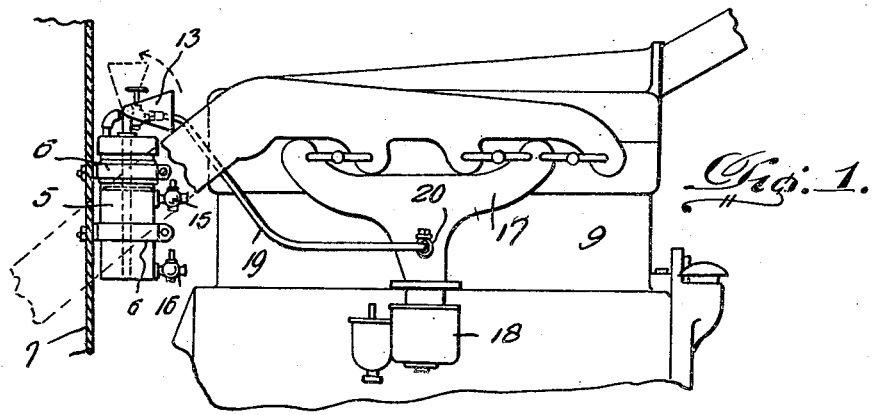
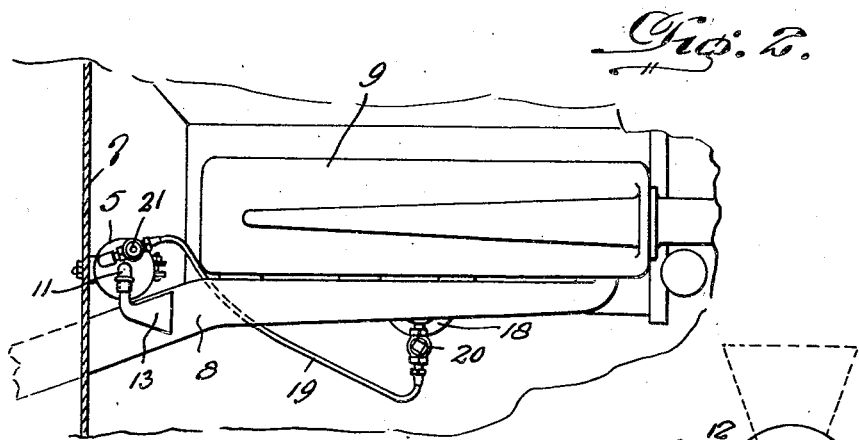
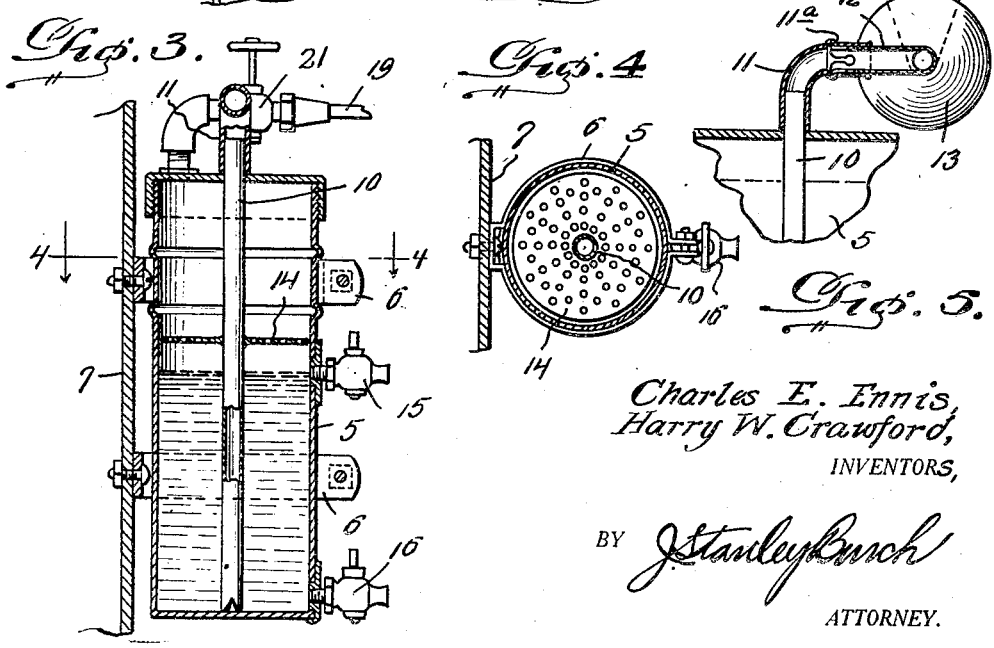
Charles E. Ennis,
Harry W. Crawford,
INVENTORS,
BY J. Stanley Busch
ATTORNEY.

Patented May 19, 1931

1,806,049

UNITED STATES PATENT OFFICE

CHARLES EDWARD ENNIS, OF EL PASO, TEXAS, AND HARRY WALLACE CRAWFORD, OF ALBUQUERQUE, NEW MEXICO

CHARGE HUMIDIFIER FOR EXPLOSIVE ENGINES

Application filed November 11, 1929. Serial No. 406,360.

This invention relates to an improved charge humidifier for explosive engines, and has more particular reference to a novel device for delivering humidified air into the intake manifold of an engine to be mixed with the explosive charges.

An object of the present invention is to provide a device of the above kind which is simple and durable in construction, economical to manufacture and install, and efficient in operation.

A further object is to provide a device of the above character, wherein means is provided to facilitate proper replenishing of the water in the water reservoir or tank, and wherein simple and efficient means is provided to prevent passage of free water into the intake manifold of the engine.

The invention consists of the novel form, combination and arrangement of parts hereinafter more fully described, shown in the accompanying drawings, and claimed.

In the drawings:

Figure 1 is a fragmentary view, mainly in side elevation, of an automobile engine equipped with a charge humidifier embodying the present invention.

Figure 2 is a top plan view thereof.

Figure 3 is an enlarged vertical section through the water reservoir.

Figure 4 is a horizontal section on line 4—4 of Figure 3; and

Figure 5 is a fragmentary vertical section taken on a plane at right angles to the plane of section of Figure 3.

Referring in detail to the drawing, the present invention includes a water reservoir or tank 5 mounted by means of clamping-band brackets 6 on the dash 7 of the automobile adjacent the exhaust manifold 8 of the automobile engine 9. The tank 5 is adapted to be partially filled with water, and is provided with a central air inlet pipe 10 leading through the top wall of the tank downwardly into the water to a point adjacent the bottom of the tank. An elbow 11 may be provided on the upper end of the air inlet pipe 10, and swivelled at 11a in the lateral end of this elbow is the laterally projecting smaller end 12 of an air intake funnel 13. The funnel 13 may thus be swung to a horizontal forwardly facing position in proximity to the exhaust manifold 8 so as to receive the warm air present in this vicinity when the engine is running, or it may be swung upwardly to a vertical position to receive cooler air or to act as a filler funnel when replenishing the water in the tank 5, as illustrated in Figures 1 and 5.

A perforated metal disk or plate 14 is fixed on the inlet pipe 10 intermediate the top and bottom of the tank 5 so as to divide the latter into a lower water compartment and an upper collection or outlet compartment for the humidified air. A pet cock 15, provided on the side of the tank 5 directly below the disk 14, is adapted to be opened to form an overflow outlet for the water chamber, thereby insuring maintenance of the water below the level of the disk 14 when replenishing the water in said chamber through the funnel 13 and inlet pipe 10. A further pet cock 16 is provided on the tank 5 near the bottom thereof to facilitate draining of said tank for cleaning it, or the like.

The intake manifold of the engine 9 is shown at 17 and the carburetor thereof at 18. Communicating with the manifold 17 is one end of a tube 19 in which is provided a check valve 20, the other end of the tube 19 being connected with and in communication with the upper air chamber of the tank 5 and provided with a control valve 21.

In operation, the pet cock 15 is opened and water is poured into the tank 5 through the funnel 13 and pipe 10, until the level of the water reaches the pet cock 15 and the water overflows from the latter. The pet cock 15 is then closed, and the engine 9 is started. The engine creates a suction in pipe 19, which draws air into the funnel 13 and pipe 10, through the water, and then through the perforations of the disk 14 into the chamber above the latter. This air is then drawn from such chamber through pipe 19 into the intake manifold 17 for being mixed with the explosive charges which pass through the latter. As the air passes through the water, it carries moisture with it. The perforated disk 14, however, will prevent splashing of the water into the upper air chamber of the tank 5, and will thereby insure against passage of free or excess water into the pipe 19 and the manifold 17. By adjusting the valve 21, the amount of humidified air delivered to the engine may be properly regulated. The suction in the manifold 17 causes the check valve 20 to open and permit the moistened air to pass into said manifold from pipe 19, but should there be any back pressure in the intake manifold due to leaky engine valves or due to back-firing of the engine, the check valve 20 will close and prevent objectionable back-pressure in the pipe 19 and the tank 5.

Moreover, the device may be readily and cheaply manufactured and installed, and by reason of its durable construction and small number of frail and moving parts, it will operate efficiently for an indefinite period by merely replenishing the water when necessary.

Minor changes are contemplated within the spirit and scope of the invention as claimed.

What we claim as new is:

1. A device to supply humidified air to the intake manifold of an explosive engine by inspiration, comprising a closed tank adapted to be partly filled with water, an air intake pipe leading into said tank in proximity to the bottom thereof and below the level of the water, an air intake and filler funnel swivelled to the upper end of said air intake pipe for selective horizontal or vertical positioning, and a conduit leading from the tank above the level of said water to said engine intake manifold.

2. A device to supply humidified air to the intake manifold of an explosive engine by inspiration, comprising a closed tank adapted to be partly filled with water, an air inlet pipe open to the atmosphere and leading into said tank in proximity to the bottom thereof and below the level of the water, said air inlet pipe adapted to further function as a filler pipe when replenishing the supply of water within the tank, a valve controlled over-flow outlet for said tank to facilitate determination when water has been placed in said tank to the desired level, a splash plate rigidly carried by said air inlet pipe directly above the water level and perforated to permit the free passage of humidified air upwardly therethrough while preventing splashing of water upwardly past the same, and a conduit leading from the tank above the level of said water and above said splash plate and adapted for connection with the engine intake manifold, and an air inlet funnel associated with the upper end of said air inlet pipe, said funnel projecting forwardly into proximity with the engine to receive warm air in the vicinity of the latter.

3. A device to supply humidified air to the intake manifold of an explosive engine by inspiration, comprising a closed tank adapted to be partly filled with water, an air inlet pipe open to the atmosphere and leading into said tank in proximity to the bottom thereof and below the level of the water, said air inlet pipe adapted to further function as a filler pipe when replenishing the supply of water within the tank, a valve controlled over-flow outlet for said tank to facilitate determination when water has been placed in said tank to the desired level, a splash plate rigidly carried by said air inlet pipe directly above the water level and perforated to permit the free passage of humidified air upwardly therethrough while preventing splashing of water upwardly past the same, and a conduit leading from the tank above the level of said water and above said splash plate and adapted for connection with the engine intake manifold, and an air inlet funnel associated with the upper end of said air inlet pipe, said funnel projecting forwardly into proximity with the engine to receive warm air in the vicinity of the latter, and means connecting said funnel with said air inlet pipe for movement relative thereto whereby the funnel may be positioned vertically, at will.

In testimony whereof we affix our signatures.

CHARLES EDWARD ENNIS.
HARRY WALLACE CRAWFORD.